Jan. 16, 1940.  G. GLOCKER  2,187,395
CONTAINER KEY
Filed Oct. 3, 1938
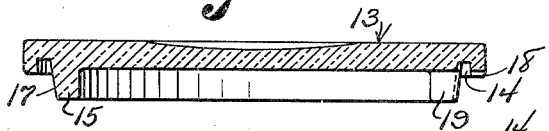
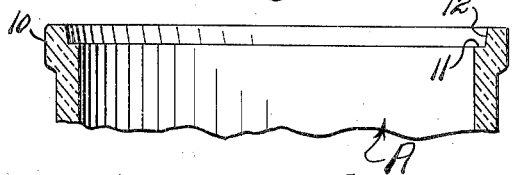
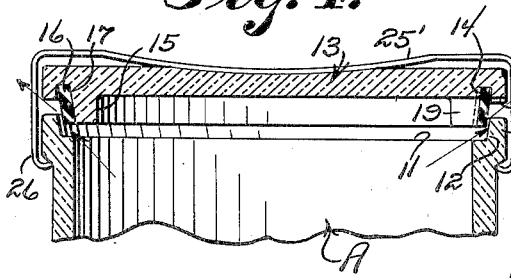
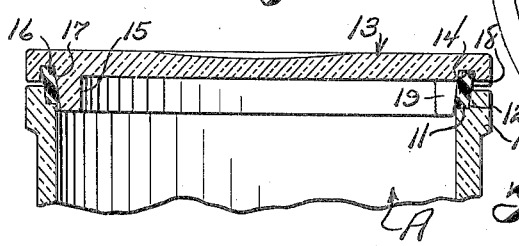
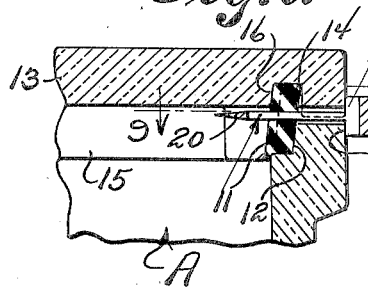
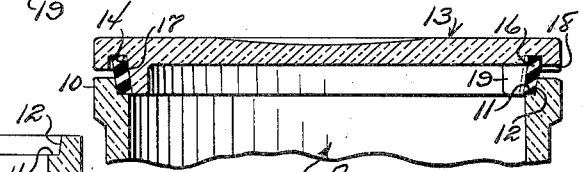
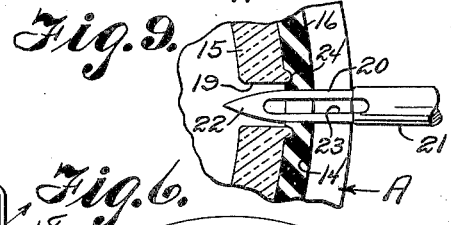
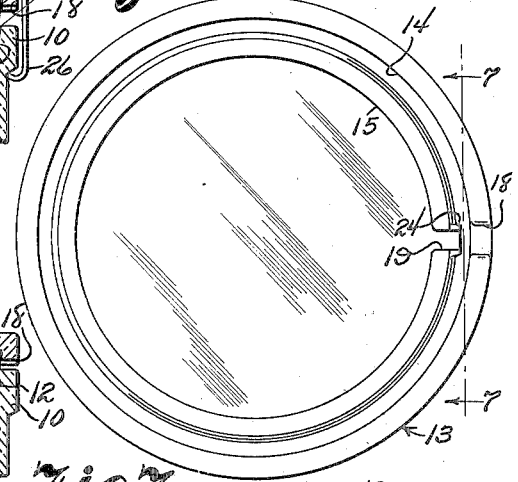
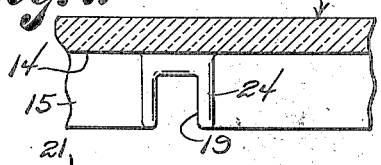
Gustave Glocker
INVENTOR
BY Victor J. Evans & Co.
ATTORNEYS Patented Jan. 16, 1940

2,187,395

UNITED STATES PATENT OFFICE 2,187,395

CONTAINER KEY

Gustave Glocker, Capitol Heights, Md.

Application October 3, 1938, Serial No. 233,073

3 Claims. (Cl. 30—315)

The invention relates to a container key and more especially to a jar or the like lid or cover seal key.

The primary object of the invention is the provision of a device of this character, wherein the lid or cover has fitting with the body of a container, jar or the like in association with a rubber gasket or ring so that there will be a vacuum seal and such lid or cover can not be removed from the body of the container, jar or the like except by the breaking of the seal to relieve the vacuum interiorly of said container, jar or the like, the seal being broken in a novel manner and through the instrumentality of a key.

Another object of the invention is the provision of a device of this character, wherein on the application of the lid or cover to the body of the container, jar or the like the air will be expelled from the interior of said container, jar or the like for effecting a vacuum seal of the lid or cover thereon and assuring against leakage at the lid or cover so that the contents of the container, jar or the like will be maintained fresh.

A further object of the invention is the provision of a device of this character, wherein the rubber ring or gasket associated with the body of the container, jar or the like and the lid or cover therefor will be firmly held against displacement and such ring or gasket will be compressed in its seating between the body and the said lid or cover for a positive sealing of the container, jar or the like while on the breaking of the vacuum within the container, jar or the like. The lid or cover can be readily removed and the breaking of the vacuum is effected by a key which punctures the rubber ring or gasket and the puncturing thereof does not destroy the further use of such ring or gasket for sealing purposes in its use with a container, jar or the like.

A still further object of the invention is the provision of a device of this character, wherein the key in its construction is such in the use thereof to break the seal between the lid or cover and the body of the container, jar or the like, or, in other words, destroy the vacuum within the said body and thus enabling the lid or cover to be removed without undue labor.

A still further object of the invention is the provision of a device of this character, which is simple in its construction, thoroughly reliable and efficient in operation, assuring a positive fluid-tight seal between the lid or cover and the body of the container, jar or the like, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical sectional view through a lid or cover for a container, jar or the like and is constructed in accordance with the invention.

Figure 2 is a fragmentary vertical sectional view through the body of the container, jar or the like for the fitting of the lid or cover thereto.

Figure 3 is a fragmentary vertical sectional view showing the lid or cover applied to the body of the container, jar or the like.

Figure 4 is a view similar to Figure 3 showing a step in the application of the lid or cover to the body of the container, jar or the like for the sealing thereof.

Figure 5 is a view similar to Figure 3 showing the final sealing of the lid or cover to the body of the container, jar or the like.

Figure 6 is a top plan view of the body of the container, jar or the like with the lid or cover thereon.

Figure 7 is a sectional view taken on the line 7—7 of Figure 6 looking in the direction of the arrows.

Figure 8 is a fragmentary enlarged vertical sectional view showing a key puncturing the seal of the lid or cover on the body of the container, jar or the like.

Figure 9 is a sectional view taken on the line 9—9 of Figure 8 looking in the direction of the arrows.

Similar reference characters indicate corresponding parts throughout the several views in the drawing.

Referring to the drawing in detail, A designates generally a portion of the body of a container, jar or the like, preferably of the glass type, and having, as usual, the open mouth, which is formed with an outstruck annular rim 10 having an internal countersunk annular shoulder 11 providing a seat within the mouth or open end of said body. The side wall 12 of the seat created by the shoulder 11 is downwardly beveled for a purpose presently described.

The mouth or open end of the body constituting the container, jar or the like A is adapted to be closed by a removable lid or cover 13, which is of a diameter corresponding to the external diameter of the rim 10 of the said body and formed in the bottom face of said lid or cover 13 is an annular groove or channel 14 which is adapted to register with the countersunk shoulder 11 in the rim 10 while inwardly of this channel or groove 14 and depending from the bottom face of the lid or cover is an annular backing wall 15 for a resilient ring or gasket 16, which is fitted within the groove or channel 14 and is adapted for contact with the shoulder 11 in the mouth or open end of the body for effecting a seal between the lid or cover and said body constituting the container, jar or the like. The backing wall 15 is downwardly beveled at 17 corresponding to the beveled wall 12, hereinbefore referred to, so as to confine the ring or gasket 16 between these walls and at the same time on the application of the lid or cover 13 the air within the body of the container, jar or the like A can be expelled therefrom preceding the final seating of the lid or cover upon the body, this expulsion of air being indicated by the arrows shown in Figure 4 of the drawing, the final seating and sealing of the lid or cover being shown in Figures 5 and 8 of said drawing.

The ring or gasket 16 is deep and has a width corresponding to the width of the channel or groove 14 and by the presence of the rim 10 on the body of the container, jar or the like A and the wall 15 on the lid or cover a four-point contact of this ring or gasket 16 will be had therebetween. At the same time an overlap is assured with respect to the joint between the lid or cover and the body of the container, jar or the like A so that a perfect fluidtight seal is had therebetween.

Formed in the rim 10 is a transverse opening or notch 18 while adapted to register therewith is an opening or notch 19 formed in the backing wall 15 and carried entirely therethrough transversely of the same. These openings or notches 18 and 19, when in alignment with each other on the sealing of the lid or cover upon the body, constitute a way for a puncturing blade 20 of a key 21, the blade being formed with a pointed, free or piercing end 22. The blade 20 also is provided with an elongated slot 23 so that when the said blade is pierced through the ring or gasket 16 an air way is created to permit entrance of air interiorly of the body of the container, jar or the like A, when the lid or cover is sealed thereon and in this way the vacuum is broken within said body and the seal destroyed so that the lid or cover can be readily removed from the open end or mouth of the container, jar or the like.

The puncturing or piercing of the ring or gasket 16 does not destroy the further use thereof because the punctured area can be shifted away from the points of the openings or notches 18 and 19 hereinbefore mentioned and thus a perfect fluidtight seal may be had between the lid or cover and the body of the container, jar or the like in the further use of said ring or gasket.

About the notch or opening 19, that is, the upper end thereof and at opposite sides of the same is the rib formation 24, which bites into the ring or gasket 16 for preventing the creeping thereof or undue expansion of the same so that positive piercing or puncturing of such ring or gasket at the area thereof confronting the openings or notches 18 and 19 can be assured. This rib formation 24 also creates a seal in conjunction with the ring or gasket 16 about the entrance way for the key so that air from without can not make entrance at this point to within the container, jar or the like, this point being the weakened area thereof.

The key 21 at the inner end of the blade 20 has formed therewith a shoulder 25 which limits the insertion of the blade in the ring or gasket 16 when the latter is punctured or pierced so that a positive admission of air from without to within the container, jar or the like is assured in that the slot 23 in said blade will not be closed, which would be the case if the blade were inserted too far within the container, jar or the like during the piercing operation.

Straddling the lid or cover 13 when applied to the open end or mouth of the body of the container, jar or the like is a spring clip or clamp which involves a downwardly bowed springy intermediate portion 25' and downturned hook-like terminal legs 26, respectively. The clip or clamp, when bridging the lid or cover 13, permits a rise of the latter from the jar when within a cooker so as to permit the automatic escape of pressure within said container, jar or the like and thus relieves any resistance of the lid or cover becoming sealed during the cooling of the contents of the container, jar or the like and a four-point seal of the ring or gasket 16 will take place between the lid or cover and the said container, jar or the like by vacuum sealing action.

What is claimed is:

1. In a device of the character described, a key having a pointed piercing blade of an extent greater than an area penetrated thereby and also provided with a slot disposed longitudinally in said blade, and a stop shoulder formed exteriorly on the key between the ends of the slot for limiting the penetration of the blade and exposing the said slot beyond the penetrated area of said blade.

2. In a device of the character described, a key having a pointed piercing blade of an extent greater than an area penetrated thereby and also provided with a slot disposed longitudinally in said blade, and a stop shoulder formed exteriorly on the key between the ends of the slot for limiting the penetration of the blade and exposing the said slot beyond the penetrated area of said blade, the said blade being flattened.

3. In a device of the character described, a key having a pointed piercing blade of an extent greater than an area penetrated thereby and also provided with a slot disposed longitudinally in said blade, and a stop shoulder formed exteriorly on the key between the ends of the slot for limiting the penetration of the blade and exposing the said slot beyond the penetrated area of said blade, the said blade being flattened, the said shoulder being at opposite sides of the blade.

GUSTAVE GLOCKER.